United States Patent
Xu et al.

(10) Patent No.: US 9,633,483 B1
(45) Date of Patent: Apr. 25, 2017

(54) SYSTEM FOR FILTERING, SEGMENTING AND RECOGNIZING OBJECTS IN UNCONSTRAINED ENVIRONMENTS

(71) Applicant: HRL Laboratories, LLC, Malibu, CA (US)

(72) Inventors: Jiejun Xu, Chino, CA (US);
Kyungnam Kim, Oak Park, CA (US);
Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 14/669,833

(22) Filed: Mar. 26, 2015

Related U.S. Application Data (60) Provisional application No. 61/971,364, filed on Mar. 27, 2014, provisional application No. 61/989,106, (Continued)

(51) Int. Cl.
 *G06T 19/20* (2011.01)
 *G06K 9/46* (2006.01)
 *G06K 9/62* (2006.01)

(52) U.S. Cl.
 CPC ............ *G06T 19/20* (2013.01); *G06K 9/4604* (2013.01); *G06K 9/6267* (2013.01)

(58) Field of Classification Search
 CPC ......... G06T 19/20; G06T 17/10; G06T 19/00; G06T 2210/56; G06K 9/4604;
(Continued)

(56) References Cited

U.S. PATENT DOCUMENTS

| 8,948,501 | B1 * | 2/2015 | Kim | ...................... G01S 7/4808 345/419 |
| 9,141,852 | B1 * | 9/2015 | Cosgun | ............. G06K 9/00335 |

(Continued)

FOREIGN PATENT DOCUMENTS

WO  WO 2013178725  12/2013

OTHER PUBLICATIONS

International Search Report of the International Searching Authority for PCT/US2015/022787; date of mailing Jun. 26, 2015.
(Continued)

*Primary Examiner* — Jingge Wu
(74) *Attorney, Agent, or Firm* — Tope-McKay & Associates (57) ABSTRACT

Described is a system for filtering, segmenting and recognizing objects. The system receives a three-dimensional (3D) point cloud having a plurality of data points in 3D space and down-samples the 3D point cloud to generate a down-sampled 3D point cloud with reduced data points in the 3D space. A ground plane is then identified and removed, leaving above-ground data points in the down-sampled 3D point cloud. The above-ground data points are clustered to generate a plurality of 3D blobs, each of the 3D blobs having a cluster size. The 3D blobs are filtered based on cluster size to generate a set of 3D candidate blobs. Features are extracted from each 3D candidate blob. Finally, at least one of the 3D candidate blobs is classified as a pre-defined object class based on the extracted features.

24 Claims, 7 Drawing Sheets

Related U.S. Application Data filed on May 6, 2014, provisional application No. 61/987,122, filed on May 1, 2014.

(58) Field of Classification Search
CPC ............. G06K 9/6267; G06K 9/00201; G06K 9/00335; G06K 9/00362; G06K 9/00369; G06K 9/46; G06K 9/4638
See application file for complete search history.

(56) References Cited

U.S. PATENT DOCUMENTS

| | | | | |
|---|---|---|---|---|
| 2008/0192044 | A1* | 8/2008 | Fowler | G06T 13/20 345/419 |
| 2009/0232355 | A1* | 9/2009 | Minear | G06K 9/00201 382/103 |
| 2010/0208035 | A1* | 8/2010 | Pinault | G06K 9/00362 348/46 |
| 2011/0102545 | A1* | 5/2011 | Krishnaswamy | G01C 21/12 348/46 |
| 2011/0293137 | A1* | 12/2011 | Gurman | G06K 9/00201 382/103 |
| 2012/0075342 | A1* | 3/2012 | Choubassi | G06T 7/0081 345/633 |
| 2012/0116226 | A1 | 5/2012 | Specht | |
| 2012/0117122 | A1* | 5/2012 | Wang | G06F 17/30333 707/797 |
| 2012/0121166 | A1* | 5/2012 | Ko | G06K 9/00234 382/154 |
| 2013/0051658 | A1 | 2/2013 | Hwang et al. | |
| 2013/0230206 | A1 | 9/2013 | Mendez-Rodrigues et al. | |
| 2013/0343673 | A1 | 12/2013 | Pal et al. | |
| 2014/0278587 | A1* | 9/2014 | Plummer | G06Q 40/00 705/4 |
| 2014/0334670 | A1* | 11/2014 | Guigues | G06T 7/2046 382/103 |
| 2015/0120750 | A1* | 4/2015 | Hefeeda | G06F 17/30961 707/741 |

OTHER PUBLICATIONS

The Written Opinion of the International Searching Authority for PCT/US2015/022787; date of mailing Jun. 26, 2015.
International Preliminary Report on Patentability for PCT/US2015/022787; date of mailing Apr. 21, 2016.
Alex Teichman, et al., "Towards 3D Object Recognition via Classification of Arbitrary Object Tracks", 2011 IEEE International Conference on Robotics and Automation Shanghai International Conference Center, pp. 4034-4041, May 9-13, 2011, Shanghai, China.
Radu Bogdan Rusu and Steve Cousins, "3D is here: Point Cloud Library (PCL)", ICRA Communications, 2011.
A. Johnson, Spin-Images: A Representation for 3-D Surface Matching, doctoral dissertation, The Robotics Institute, Carnegie Mellon Univ., 1997.
A. Johnson and M. Hebert, "Efficient Multiple Model Recognition in Cluttered 3-D Scenes," Proc. IEEE Conf. Computer Vision and Pattern Recognition, pp. 671-678, 1998.
A. Johnson and M. Hebert, "Using Spin Images for Efficient Object Recognition in Cluttered 3D Scenes", IEEE Trans. Pattern Analysis and Machine Intelligence, vol. 21, pp. 433-449, 1999.
Dennis Braunreiter, Jeremy Furtek, Hai-Wen Chen, and Dennis Healy, "Overview of Implementation of DARPA GPU Program in SAIC," SPIE Defense & Security Symposium, Proceedings of Independent Component Analyses, Wavelets, Unsupervised Nano-Biomimetic Sensors and Neural Networks, VI, vol. 6979, pp. 0W01-0W09, Orlando, FL, Mar. 17-19, 2008.
W. Zhao, D. Nister, and S. Hsu, "Alignment of continuous video onto 3d point clouds", IEEE Transactions on Pattern Analysis and Machine Intelligence, 27(8):1305-1318. 2005.
M. Ding, K. Lyngbaek and A. Zakhor, "Automatic registration of aerial imagery with untextured 3D LiDAR models", Computer Vision and Pattern Recognition, pp. 1-8, 2008.
C Fruh and A. Zakhor. "An automated method for large-scale, ground-based city model acquisition", International Journal of Computer Vision, 60(1):5-24, Oct. 2004.
L. Liu and I. Stamos. "Automatic 3D and 2D registration for the photorealistic rendering of urban scenes", Computer Vision and Pattern Recognition, pp. 137-143, Jun. 2005.
L. Liu, G. Yu, G. Wolberg and S. Zokai, "Multiview Geometry for Texture Mapping 2D Images Onto 3D Range Data", IEEE Conference on Computer Vision and Pattern Recognition, vol. 2, pp. 2293-2300, 2006.
B. Douillard, D. Fox, F. Ramos, and H. Durrant-Whyte. Classification and semantic mapping of urban environments. In IJRR, 2011.
K. Lai and D. Fox. Object recognition in 3D point clouds using web data and domain adaptation. IJRR, 29(8), 2010.
X. Xiong and D. Huber. Using context to create semantic 3D models of indoor environments. In Proc. BMVC 2010.
W. L. Lu, K. Okuma, and J. J. Little. A hybrid conditional random field for estimating the underlying ground surface from airborne lidar data. IEEE T-GRS, 47(8), 2009.
B. Douillard, J. Underwood, V. Vlaskine, A. Quadros, and S. Singh. A pipeline for the segmentation and classification of 3D point clouds. In Proc. of the International Symposium on Experimental Robotics (ISER), 2010.
Point Cloud Library, http://www.pointclouds.org/documentation/tutorials/planar_segmentation.php taken on May 1, 2004.
Radu Bogdan Rusu, "Semantic 3D object maps for everyday manipulation in human living environments", PhD thesis, 2009.
The Stanford 3D scanning repository, http://graphics.stanford.edu/data/3Dscanrep/, last modified Sep. 2, 2013, captured May 1, 2014.
The KITTI vision Benchmark Suite http://www.cvlibs.net/datasets/kitti/, captured May 1, 2014.
A. Johnson, Spin-Images: A Representation for 3-D Surface Matching, doctoral dissertation. The Robotics Institute, Carnegie Mellon Univ., 1997.
W. Zhao, D. Nister, and S. Hsu, "Alignment of continuous video onto 3d point clouds", IEEE Transactions on Pattern Analysis and Machine Intelligence, 27(8):1305-1318, 2005.
C. Fruh and A. Zakhor, "An automated method for large-scale, ground-based city model acquisition", International Journal of Computer Vision, 60(1):5-24, Oct. 2004.
L. Liu and I. Stamos, "Automatic 3D and 2D registration for the photorealistic rendering of urban scenes", Computer Vision and Pattern Recognition, pp. 137-143, Jun. 2005.

* cited by examiner

SYSTEM FOR FILTERING, SEGMENTING AND RECOGNIZING OBJECTS IN UNCONSTRAINED ENVIRONMENTS

CROSS-REFERENCE TO RELATED APPLICATIONS

The present application is a non-provisional application of U.S. Provisional Application No. 61/971,364, filed on Mar. 27, 2014, entitled, "Robust Motion 3D Exploitation: A Full Pipeline of Filtering, Segmenting and Recognizing Objects in Unconstrained Environments," the entirety of which is incorporated herein by reference.

This is ALSO a non-provisional application of U.S. Provisional Application No. 61/989,106, filed on May 6, 2014, entitled, "System for Filtering, Segmenting and Recognizing Objects in Unconstrained Environments," the entirety of which is incorporated herein by reference.

This is ALSO a non-provisional application of U.S. Provisional Application No. 61/987,122, filed on May 1, 2014, entitled, "Adaptive 3D to 2D Projection for Different Height Slices and Extraction of Robust Morphological Features for 3D Object Recognition," the entirety of which is incorporated herein by reference.

BACKGROUND OF THE INVENTION (1) Field of Invention

The present invention relates to an object recognition system and, more particularly, to a system for filtering, segmenting, and recognizing objects in three-dimensional data.

(2) Description of Related Art

Recent advances in range sensor technology provide the ability to collect three-dimensional (3D) data over large areas with high resolution and accuracy. The precision of the collected 3D data is usually high enough to capture not only common large structure (e.g., buildings), but also smaller objects such as pedestrians and cyclists. This improvement enables 3D based scene analysis for a wide range of applications.

3D Scene analysis has been studied under quite a few different settings, including urban city (see the List of Incorporated Literature References, Literature Reference No. 12), indoor (see Literature Reference No. 3), and aerial settings (see Literature Reference No. 4). Different techniques have been developed for labeling surfaces such as grass, walls, or pavement, and small sets of object types such as foliage, people, and cars in 3D outdoor scenes. Most of these approaches label individual 3D laser points using features describing local shape and appearance in combination with spatial and temporal smoothing via graphical model inference. Typically, features are either extracted from a fixed neighborhood around 3D points or from small patches generated through an over segmented scene. In the structured graphical model, a node in the graph is a random variable representing a 3D feature point's label and edges are formed to model the scene context. In order to be effective, many interactions need to be considered, which result in a densely linked graph/random field. In general, exact inference over such a random field is intractable and only approximate methods can be used. This complicates the learning process further. In addition, the use of approximate inference makes the learned solutions somewhat arbitrary and sensitive to parameters.

The work by Douillard et al. (see Literature Reference No. 5), for example, references the use of 3D point clouds as a possible solution for classification. In the work of Douillard et al., a pipeline for fast segmentation of 3D point clouds and subsequent classification of the obtained 3D segments is proposed. However, the core of their classification module relies on aligning candidate segments with a set of pre-defined 3D templates via an Iterative Closest Point (ICP) algorithm. In other words, the work of Doilard et al. requires predefining 3D object templates (i.e., reference 3D point clouds), and the iterative alignment step requires substantial computational time.

Thus, continuing need exists for a system that can recognize objects that does not require modeling a scene for object entity classification and, further, does not require the labeling of individual 3D feature points. In other words, a continuing need exists for a system that provides for unsupervised detection and segmentation of 3D candidate objects in an uncontrolled environment.

SUMMARY OF INVENTION

Described is a system for filtering, segmenting and recognizing objects. The system includes one or more processors and a memory. The memory has executable instructions encoded thereon, such that upon execution of the instructions, the one or more processors perform several operations, including: receiving a three-dimensional (3D) point cloud having a plurality of data points in 3D space; down sampling the 3D point cloud to generate a down-sampled 3D point cloud P with reduced data points in the 3D space; identifying and removing a ground plane in the down-sampled 3D point cloud to leave non-ground (e.g., above ground) data points in the down-sampled 3D point cloud (e.g., the non-ground data points, in one aspect, are data points above the ground plane); clustering the non-ground data points to generate a plurality of 3D blobs, each of the 3D blobs having a cluster size; thresholding the 3D blobs based on cluster size to generate a set of 3D candidate blobs; extracting features from each 3D candidate blob; and classifying at least one of the 3D candidate blobs as a pre-defined object class based on the extracted features.

In another aspect, the 3D point cloud is down sampled using a 3D voxel grid having a plurality of voxels. The 3D voxel grid is positioned over the 3D point cloud such that all the data points in each voxel are down-sampled to a centroid for each voxel.

Additionally, in identifying and removing the ground plane, the ground plane is identified using a plane model such that the plane with a maximum number of points is identified as the ground plane.

In yet another aspect, identifying and removing the ground plane further comprises operations of: randomly selecting three non-collinear unique points from the down-sampled 3D point cloud P; computing plane model (a, b, c, d) coefficients from the three non-collinear unique points using the following equation: $ax+by+cz+d=0$; computing distances from all points in the down-sampled 3D point cloud P to the plane model (a, b, c, d); determining a number of points p* belonging to the down-sampled 3D point cloud P whose distance to the plane model falls between a pre-defined range (e.g., threshold); and designating a plane with a largest number of points p* that fall within the pre-defined range as the ground plane; and removing the points p* that are included in the ground plane from the down-sampled 3D point cloud P data to leave non-ground data points.

Further, clustering the non-ground data points to generate a plurality of 3D blobs further comprises operations of: creating a kd-tree representation for the down-sampled 3D point cloud P; generating an empty list of clusters C, and a queue of the points that need to be checked Q; and for every point $p_i \in P$, performing the following operations:

adding $p_i$ to the current queue Q;

for every point $p_i \in Q$ do:

recursively adding all neighboring points in a sphere with a fixed radius, and when the list of all points in Q has been processed, add Q to the list of clusters C, and reset Q to an empty list; and terminating when all points in the original point cloud have been processed and are now part of the list of clusters C.

In another aspect, extracting features from each 3D candidate blob further comprises operations of: projecting the 3D candidate blobs into multiple two-dimensional (2D) image slices at different heights; and processing each 2D image slice to extract features from each 2D image slice.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to an object recognition system and, more particularly, to a system for filtering, segmenting, and recognizing objects in three-dimensional data. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of various principal aspects of the present invention is provided. Subsequently, an introduction provides the reader with a general understanding of the present invention. Next, details of the present invention are provided to give an understanding of the specific aspects. Finally, experimental results are provided to illustrate the efficiency and effectiveness of an example application of the present invention.

(1) List of Incorporated Literature References

The following references are cited throughout this application. For clarity and convenience, the references are listed herein as a central resource for the reader. The following references are hereby incorporated by reference as though fully included herein. The references are cited in the application by referring to the corresponding literature reference number, as follows:

1. B. Douillard, D. Fox, F. Ramos, and H. Durrant-Whyte. Classification and semantic mapping of urban environments. In IJRR, 2011
2. K. Lai and D. Fox. Object recognition in 3D point clouds using web data and domain adaptation. IJRR, 29(8), 2010.
3. X. Xiong and D. Huber. Using context to create semantic 3D models of indoor environments. In Proc. BMVC 2010.
4. W. L. Lu, K. Okuma, and J. J. Little. A hybrid conditional random field for estimating the underlying ground surface from airborne lidar data. IEEE T-GRS, 47(8), 2009.
5. B. Douillard, J. Underwood, V. Vlaskine, A. Quadros, and S. Singh. A pipeline for the segmentation and classification of 3D point clouds. In Proc. of the International Symposium on Experimental Robotics (ISER), 2010.
6. Point Cloud Library, http://www.pointclouds.org/documentation/tutorials/planar_segmentation.php, taken on May 1, 2004.
7. Radu Bogdan Rusu, "Semantic 3D object maps for everyday manipulation in human living environments", PhD thesis, 2009.
8. U.S. Provisional Application No. 61/987,122, filed on May 1, 2014, entitled, "Adaptive 3D to 2D Projection for Different Height Slices and Extraction of Robust Morphological Features for 3D Object Recognition."
9. The Stanford 3D scanning repository, http://graphics.stanford.edu/data/3Dscanrep/, last modified Sep. 2, 2013, captured May 1, 2014
10. The KITTI vision Benchmark Suite http://www.cvlibs.net/datasets/kitti/, captured May 1, 2014.

(2) Principal Aspects

The present invention has three "principal" aspects. The first is a system for filtering, segmenting, and recognizing objects in unconstrained environments. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
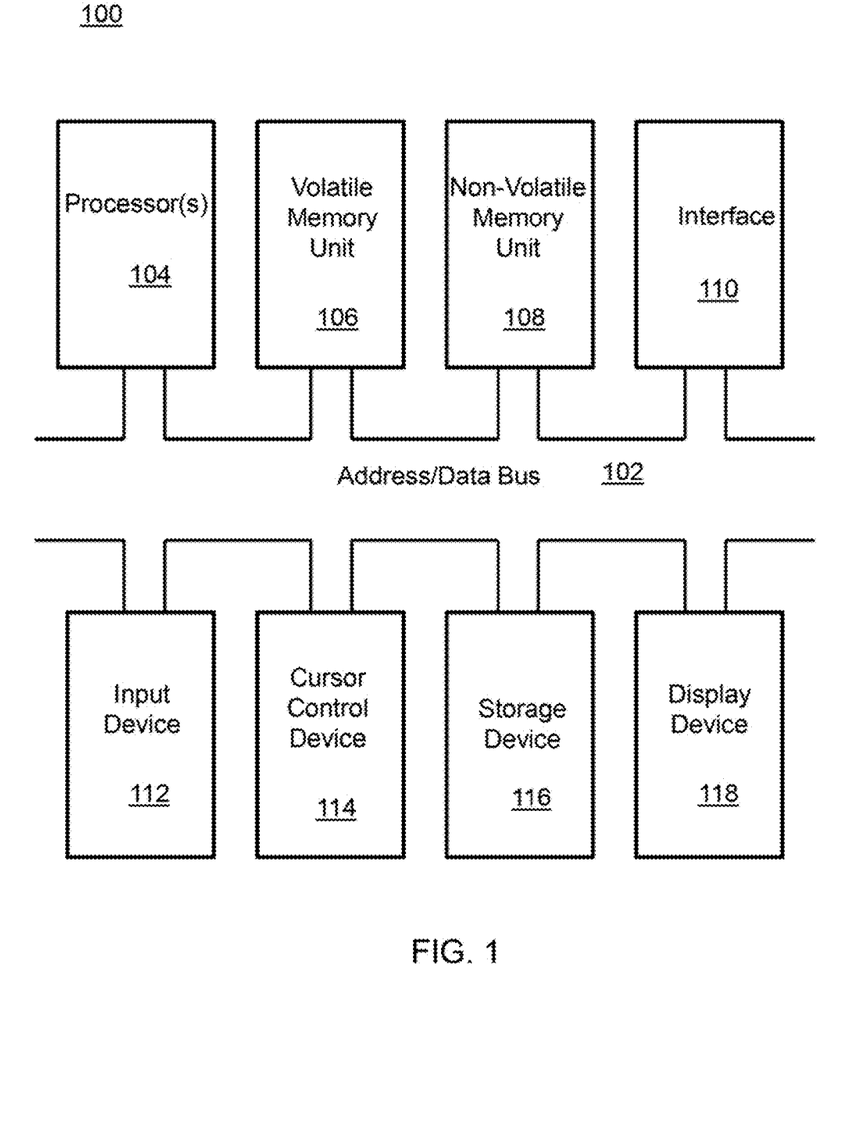
FIG. 1 is a block diagram depicting the components of a system according to the principles of the present invention.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, or a field programmable gate array.

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
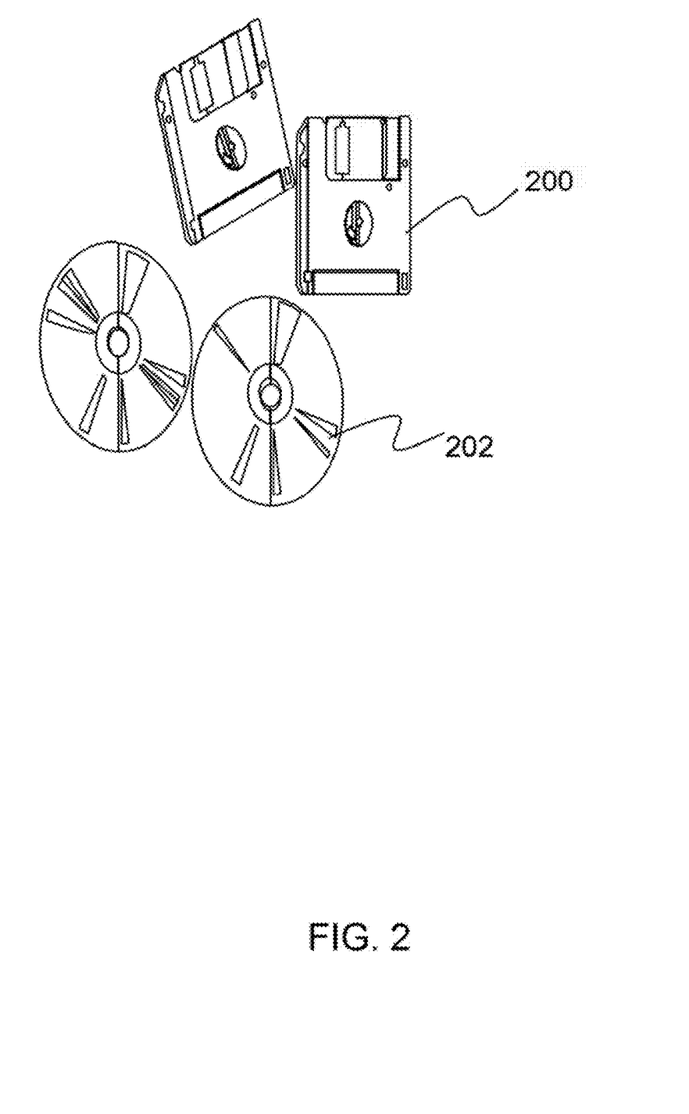
FIG. 2 is an illustration of a computer program product according to the principles of the present invention.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" may be stored in the memory of a computer or on a computer-readable medium such as a floppy disk, a CD-ROM, and a flash drive. In either event, the instructions are encoded on a non-transitory computer-readable medium.

(3) Introduction

Recent advances in range sensor technology provide the ability to collect three-dimensional (3D) data over large areas with high resolution and accuracy. The precision of the collected 3D data is usually high enough to capture not only common large structure (e.g., buildings), but also smaller objects such as pedestrians and cyclists. This improvement allows for 3D-based scene analysis for a wide range of applications. The present invention furthers such 3D-based scene analysis by providing a system for efficient segmentation and classification of 3D object entities from large urban point clouds.

Thus, described is a 3D object segmentation and recognition system for motion 3D data captured using sensors that produce a 3D point cloud. As a non-limiting example, this document describes segmenting and recognizing objects, such as pedestrian and vehicles in urban environments. However, it should be understood that the system can be applied to other applications (e.g., indoor scenes, wilderness scenes) with a wide variety of 3D objects. For example, the system can be used for wide-area surveillance, robot perception, indoor object classification, etc.

Figure 3:
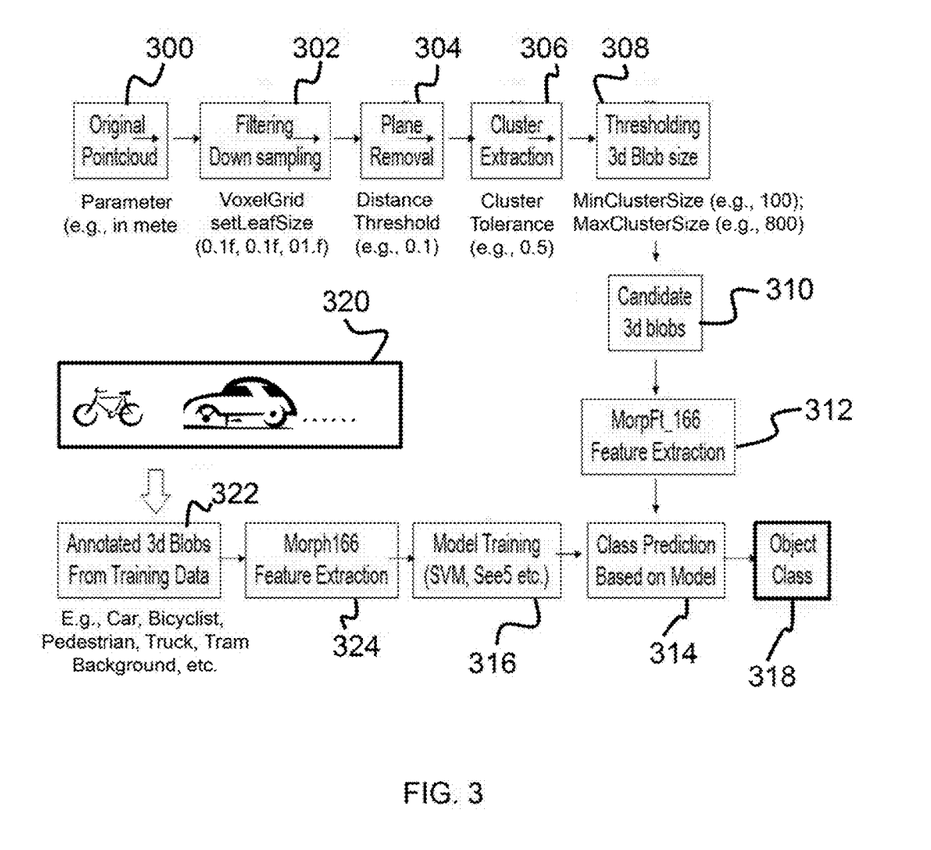
FIG. 3 is a block diagram illustrating object classification according to the principles of the present invention.

As show in FIG. 3, given an input 3D point cloud 300, the system first reduces the size of the cloud via down sampling 302 (e.g., voxel-grid sampling), which substantially improves the computational efficiency of subsequent operations (due to more compact data of the scene). The ground plane is then determined in the 3D space by finding the best fit plane model to remove 304 the plane. An unsupervised clustering 306 step is applied to the non-ground (e.g., above-ground) points to detect and segment (via thresholding 308) a set of 3D candidate blobs 310. Each of these candidate 3D blobs is characterized (via feature extraction 312) with a morphology-based feature descriptor, which captures the 3D shape information of the vertical slices of the 3D blob. Finally, these objects are classified 314 into one of the pre-defined classes (e.g., pedestrian or car) using the classifiers model training 316 offline with ground truth data (using an input image 320 to generate blobs which are annotated 322 and from which features are extracted 324).

Thus, the system efficiently reduces and segments a 3D point cloud for object cueing in a pipeline and uses outputs for effective 3D scene analysis.

(4) Specific Aspects of the Invention

As noted above, the system provides a pipeline for segmentation and recognition. FIG. 3, for example, illustrates the components for segmentation and recognition, with each of the components being described in further detail below. It should be noted that the pipeline is flexible and individual components can be swapped out easily under different scenarios. The current system provides a primary step to achieve the ultimate goal of detecting and identifying every object within a large point cloud: from pedestrian to vegetation, from bicycle to fire truck, from antenna to power plants etc.

(4.1) Filtering and Down-Sampling of Point Cloud

Figure 4:
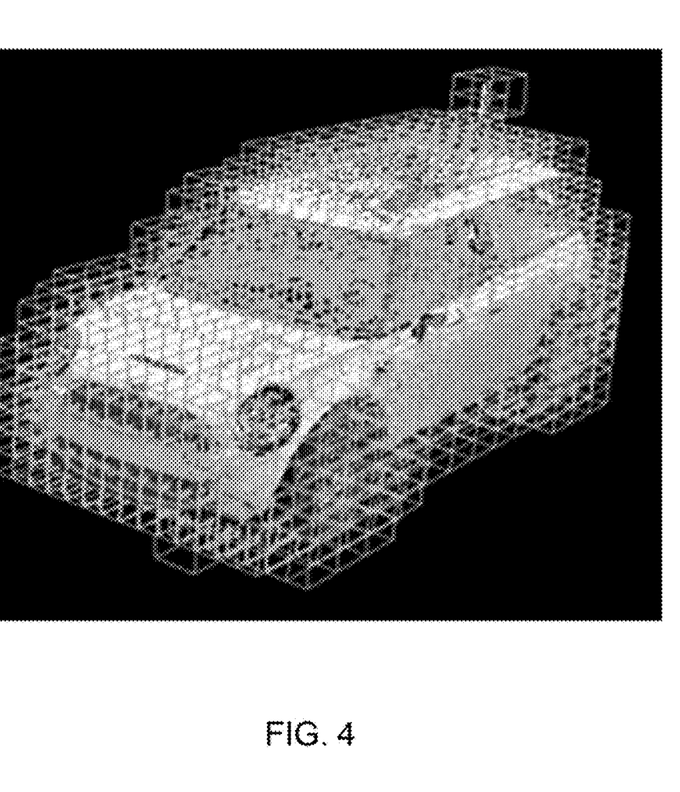
FIG. 4 is an illustration depicting an example of partitioning a point cloud (e.g., a car) into a voxel grid, which is created based on an Octree data structure.

The first step of the pipeline is to down-sample 302 the input point cloud. The main purpose of this step is to reduce the number of points in the cloud in exchange for more efficient computation without losing recognition accuracy. The point cloud can be down-sampled using any suitable down-sampling technique. As a non-limiting example, the point cloud can be down-sampled using the voxelized grid approach where a 3D voxel grid is positioned over the input point cloud data. In each voxel (i.e., 3D box), all the points inside will be approximated (i.e., down-sampled) to their centroid. For example, imagine a dense point cloud of a car. The system first partitions the point cloud using voxelized grid as depicted in FIG. 4. Then, within each voxel, the system deletes every point except for the center one. The end result is a much sparser point cloud (of the car) as compared to the initial one. For the purpose of the present invention, the system does not require the full "resolution" of the point clouds. This approach is a little slower than approximating them with the center of the voxel, but it represents the underlying surface more accurately to prevent loss of recognition accuracy. FIG. 4, for example, depicts an example of partitioning of a point cloud of a vehicle with a voxel grid.

A 3D voxel grid can be created efficiently through a hierarchical Octree data structure. An Octree data structure is a commonly understood concept to those skilled in the art, where the Octree is a tree data structure in which each Octree node has either eight children or no children. The root node describes a cubic bounding box which encapsulates all points. At every tree level, this space is further subdivided by a fixed factor, which results in an increased voxel resolution. For example, the system can utilize the VoxelGrid functionality as implemented in the Point Cloud Library (PCL) (see Literature Reference No. 6).

(4.2) Ground Plane Removal

In the context of the present application, it is desirable to identify and remove the "ground surface", where other object entities (e.g., buildings, cars, pedestrians) reside on. This is essentially fitting a plane model to the point cloud and finding the one with the maximum number of points. To speed up the search process, a Random Sample Consensus (RANSAC) algorithm is used to generate model hypotheses. The plane removal algorithm, in this non-limiting example, mainly involves the following steps:

1. Randomly select three non-collinear unique points from the 3D point cloud P;
2. Compute the plane model coefficients from the three points using equation $ax+by+cz+d=0$;
3. Compute the distances from all points that belong to the 3D point cloud P to the plane model (a, b, c, d); and 4. Count the number of points p* belonging to P whose distance to the plane model falls between a pre-defined range (e.g., threshold). A non-limiting example of a suitable threshold value is less than 0.1 meters (with a range of 0.0 to 0.1 meters).

The fourth step represents one of the many ways of "scoring" a specific model. Every set of points p* is stored, and the above steps are repeated for a number of iterations. Note that the number of iterations can be estimated with heuristics.

Figure 5:
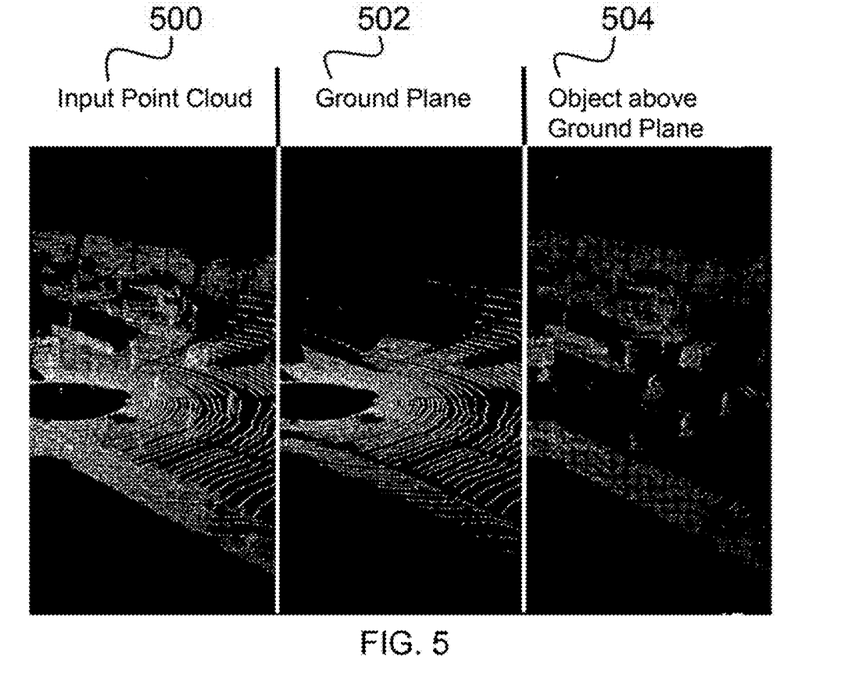
FIG. 5 is an illustration depicting an example of removing a ground plane from a point cloud.

After the process is terminated, the set with the largest number of points (inliers) is selected as the support for the best planar model found. Those points can be removed from the original point cloud before the next step in the pipeline. FIG. 5, for example, illustrates an input point cloud 500, the ground plane 502, and the objects above 504 the ground plane (after the ground plane 502 is removed). As illustrated, a large number of points are filtered out as they belong to the ground plane 502, which assists in speeding up subsequent operations.

Note that the model as illustrated only fits a large planar model to the entire point cloud, and assumes it is the ground across the entire scene. This may not be ideal when dealing with scenes with surfaces which are not uniformly flat. Thus, the system can be modified by fitting multiple smaller planar models, each with a different surface orientation, to the entire scene.

(4.3) Segmenting 3D Candidate Blobs Through Clustering

Clustering is used to divide an unorganized point cloud into smaller parts in order to generate object candidate blobs for recognition. The system can employ any suitable clustering technique. For example, most of the simpler clustering methods rely on spatial decomposition techniques that find subdivisions and boundaries to allow the data to be grouped together based a measure of "proximity". This measure of proximity is usually represented as a Minkowski norm, with the most popular instantiations being the Manhattan (L1) and Euclidean (L2) distance metrics.

A simple data clustering approach in an Euclidean sense can be implemented by making use of the Octree data structure created in an earlier step. Although this particular representation is fast to build, it is useful only for applications requiring equal spatial subdivisions. For situations where clusters can have very different sizes, a more complex algorithm may be needed.

Recall the following scenario: given an input point cloud representing an outdoor urban environment and a geometric plane model representing the ground plane, a desired objective is to find and segment the object entities which lie on top of the ground plane. To achieve this objective, the system needs to understand what an object point cluster is and what differentiates itself from another point cluster. In a more mathematical setting, a cluster is defined as follows. Let $O_i = \{p_i \in P\}$ be a distinct point cluster from $O_j = \{p_j \in P\}$ if min $\|p_i - p_j\| > d_{th}$, where $d_{th}$ is a maximum imposed distance threshold (e.g., a cluster tolerance of 0.5, as illustrated as element 306 in FIG. 3). The above equation states that if the minimum distance between a set of points $p_i$ and another set $p_j$ is larger than a given distance value, then the points in $p_i$ are set to belong to one point cluster and the ones in $p_j$ belong to another distinct point cluster. From an implementation point of view, it is important to have a notion on how this minimal distance between the two sets can be estimated. A solution is to make use of approximate nearest-neighbors queries via convention kd-tree representations. The overall algorithmic steps for object clustering are as follows:

1. Create a kd-tree representation for the input point cloud dataset P;
2. Set up an empty list of clusters C, and a queue of the points that need to be checked Q;
3. For every point $p_i \in P$, perform the following steps:
   i. add $p_i$ to the current queue Q;
   ii. for every point $p_i \in Q$ do:
   iii. recursively add all the neighboring points in a sphere with a fixed radius, and when the list of all points in Q has been processed, add Q to the list of clusters C, and reset Q to an empty list; and
4. Terminating the process when all points in the original point cloud have been processed and are now part of the list of point clusters C.

After initial clusters are extracted using the aforementioned procedure, an additional filtering step (depicted as element 308 in FIG. 3) is followed to remove overly small/large 3D clusters (e.g., minimum cluster size of 100 pixels with a maximum cluster size of 800 pixels). Referring again to FIG. 3, the clusters that survive the filtering step 308 are considered 3D candidate object blobs 310, and are passed to the next step in the pipeline for feature extraction 312.

Figure 6:
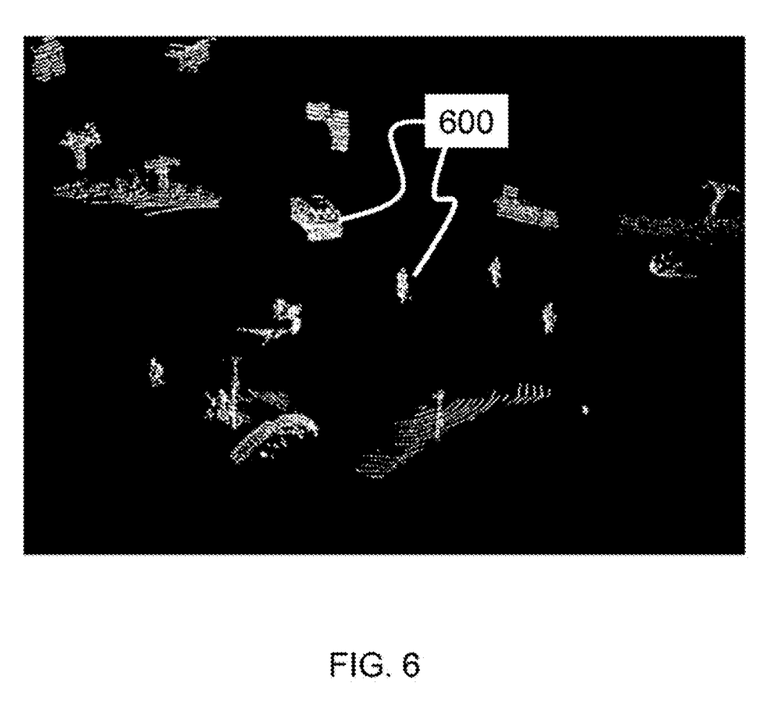
FIG. 6 is an illustration depicting an example of segmentation obtained through clustering as applied to the point cloud without the ground plane as illustrated in FIG. 5.

An example of this process is depicted in FIGS. 5 and 6. Specifically, the clustering 306 and filtering 308 are applied to the objects above the ground plane (depicted as element 504 in FIG. 5). The resulting clustering 306 and filtering 308 constructs a set of separated Euclidean object 3D blobs (depicted as element 600 in FIG. 6). Each 3D blob 600 could be uniquely identified with a numeric identification (or other identification technique) so that it can be conveniently retrieved from the algorithm.

(4.4) Feature Extraction

Figure 7:
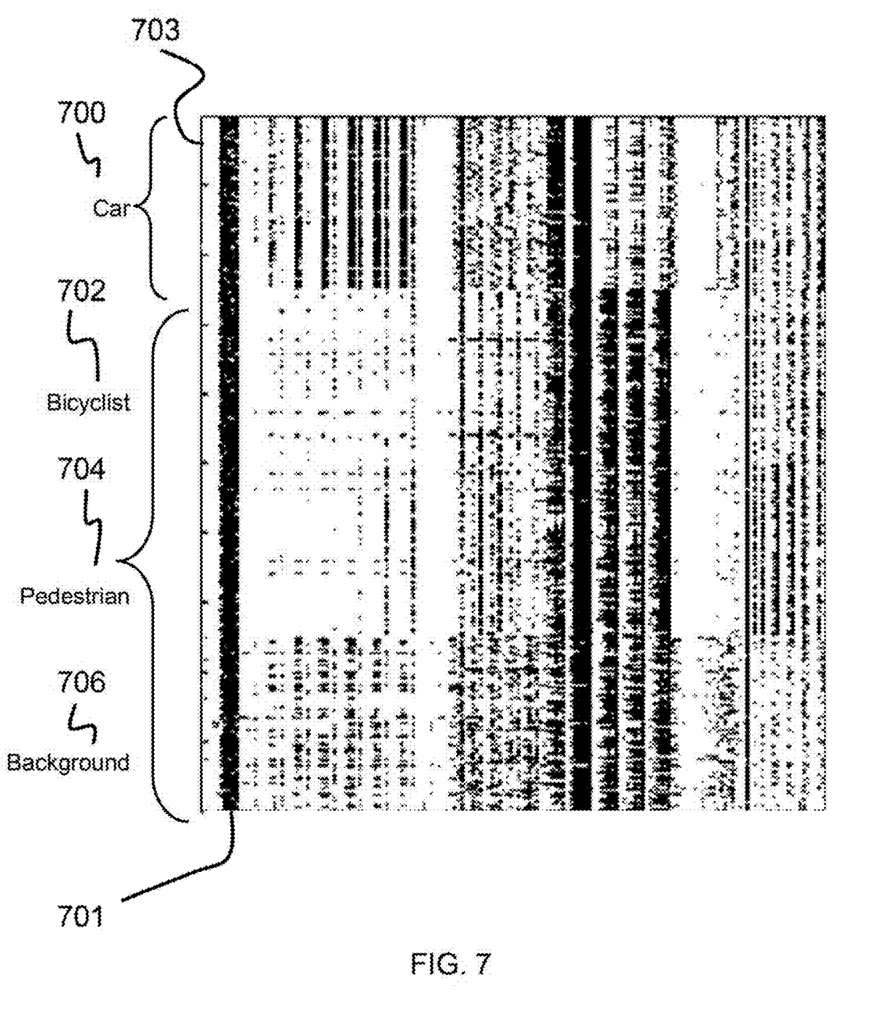
FIG. 7 is an illustration depicting extracted feature vectors.

A 3D point cloud provides useful information about the surrounding world; however, it can be difficult to extract robust features from 3D objects for recognition. The main reason for such difficulty is that the point cloud data may be irregularly scattered in the 3D space, as opposed to the regularly and uniformly sampled 2D images. The irregularly scattered point cloud can be a result of the objects being further away from a sensor, which can result in a relatively sparse point cloud. While any feature extraction technique may be employed, some may provide better results than others. For example, the system can employ the technique of adaptive 3D to 2D projection at different height slices to extract the morphological features (see Literature Reference No. 8). The basic idea is to project the 3D blob into multiple 2D image slices at various heights. The 2D slices contain all the 3D shape information of the object if the samples slices are detailed enough (similar to CT/MRI scanned slices). The 2D image slices are regularly spaced images and thus, all the available image processing techniques can be applied to process these image slices. Non-limiting examples of such imaging processing techniques include spatial filtering, view-invariant feature extraction, and other operations. Furthermore, the 2D image resolution is adaptively selected depending on the 3D point cloud density to avoid forming ill-conditioned images when the point cloud data are very sparse. In general, the adaptive sampling scheme allows the system to deal with point cloud data with as few as 50-100 points per object. As a non-limiting example, each 3D blob can be decomposed into six slices, and seven morphological features along with other moment invariant features being extracted from each slice. In short, each 3D blob can be characterized by a 166-dimension feature vector. FIG. 7, for example, is an illustration visualizing the extracted feature vectors for different classes. The X-axis is the feature dimension 701 (i.e., 166-dimensions), whereas the Y-axis represents individual 3D object 703 from different classes (i.e., each row is an object). As you can see from FIG. 7, objects from the same class exhibit a similar feature pattern, while objects from different classes have more distinct patterns.

Although illustrated in black and white, it should be noted that in actual operation, it may be desirable to visualize the extracted feature vectors for different classes in a color map fashion. Distinct visual characteristics (of the feature vectors) can be observed for different classes; car 700, bicyclist 702, pedestrian 704, and background 706. Each row is a feature vector of a 3D blob and belongs to one of the four classes. Overall features for different classes are quite distinct visually.

(4.5) Classification

A standard supervised learning paradigm is adapted in the system for 3D object classification. For each class of object (e.g., pedestrians, cars, etc.), a support vector machine (SVM) model is trained 316 in a one-against-all fashion. When a new 3D candidate blob is generated, it will be fed to the models trained for different classes. The one model giving the highest confidence score will be identified (class prediction 314), and the 3D blob will be classified as the corresponding object class.

(5) Experimental Results

To verify efficiency of the system, the system was evaluated using the point cloud datsets from the Stanford 3D repository (see Literature Reference No. 9) and the KITTI Benchmark Suite (see Literature Reference No. 10). The first dataset only provides 3D blobs of various objects, while the second dataset provide the full sequences of Velodyne scans in different urban settings. There are four primary classes in the Stanford dataset (i.e., bicyclist, car, pedestrian, and background), and six classes in the KITTI dataset (i.e., car, cyclist, van, tram, truck). All the data (3D blobs) from the Stanford dataset was used to generate 3D candidate blobs (a total of 4700 blobs) from a subset of 6 sequential scans from the KITTI dataset.

In terms of train/test division of 3D blobs, the standard division from Stanford dataset was followed, with the 3D blobs from KITTI dataset being partitioned evenly. A linear SVM kernel was used in all the SVM models. It was observed that more than 95% classification accuracy was obtained for all classes in the Stanford dataset, and more than 85% accuracy was obtained using the SVM linear kernel with non-normalized morpFt_166 features. Thus, it is clear that the system according to the present invention is effective for filtering, segmenting, and recognizing objects in three-dimensional data.

What is claimed is:

1. A system for filtering, segmenting and recognizing objects, comprising:
   one or more processors and a memory, the memory having executable instructions encoded thereon, such that upon execution of the instructions, the one or more processors perform operations of:
   down sampling a three-dimensional (3D) point cloud having a plurality of data points in 3D space to generate a down-sampled 3D point cloud P with reduced data points in the 3D space;
   identifying and removing a ground plane in the down-sampled 3D point cloud to leave non-ground data points in the down-sampled 3D point cloud;
   generating a set of 3D candidate blobs by clustering the non-ground data points to generate a plurality of 3D blobs, each of the 3D blobs having a cluster size;
   extracting features from each 3D candidate blob, the features being vectors that represent morphological characteristics of each 3D candidate blob; and
   classifying at least one of the 3D candidate blobs as a pre-defined object class based on the extracted features by assigning a semantic meaning to a segmented real-world individual object.

2. The system as set forth in claim 1, wherein generating the set of 3D candidate blobs further includes thresholding the 3D blobs based on cluster size.

3. The system as set forth in claim 1, wherein the 3D point cloud is down sampled using a 3D voxel grid having a plurality of voxels, where the 3D voxel grid is positioned over the 3D point cloud such that all the data points in each voxel are down-sampled to a centroid for each voxel.

4. The system as set forth in claim 1, wherein the ground plane is identified using a plane model such that the plane with a maximum number of points is identified as the ground plane.

5. The system as set forth in claim 1, wherein identifying and removing the ground plane further comprises operations of:
   randomly selecting three non-collinear unique points from the down-sampled 3D point cloud P;
   computing plane model coefficients from the three non-collinear unique points;
   computing distances from all points in the down-sampled 3D point cloud P to the plane model; and
   determining a number of points p* belonging to the down-sampled 3D point cloud P whose distance to the plane model falls between a pre-defined range; and
   designating a plane with a largest number of points p* that fall within the pre-defined range as the ground plane; and
   removing the points p* that are included in the ground plane from the down-sampled 3D point cloud P data to leave non-ground data points.

6. The system as set forth in claim 1, wherein clustering the non-ground data points to generate a plurality of 3D blobs further comprises operations of:
   creating a kd-tree representation for the down-sampled 3D point cloud P;
   generating an empty list of clusters C, and a queue of the points that need to be checked Q,
   for every point $p_i \in P$, performing the following operations:
   adding $p_i$ to the current queue Q;
   for every point $p_i \in Q$ do:
   recursively adding all neighboring points in a sphere with a fixed radius, and when the list of all points in Q has been processed, add Q to the list of clusters C, and reset Q to an empty list; and
   terminating when all points in the original point cloud have been processed and are now part of the list of clusters C.

7. The system as set forth in claim 1, wherein clustering the non-ground data point to generate a plurality of 3D blobs further comprises an operation of, for every point in the down-sampled 3D point cloud P, recursively adding all neighboring points in a sphere with a fixed radius to a queue.

8. The system as set forth in claim 1, wherein extracting features from each 3D candidate blob further comprises operations of:
   projecting the 3D candidate blobs into multiple two-dimensional (2D) image slices at different heights; and processing each 2D image slice to extract features from each 2D image slice.

9. A method for filtering, segmenting and recognizing objects, the method comprising an act of:
  causing one or more processors to execute instructions encoded on a non-transitory computer-readable medium, such that upon execution, the one or more processors perform operations of:
    down sampling a three-dimensional (3D) point cloud having a plurality of data points in 3D space to generate a down-sampled 3D point cloud P with reduced data points in the 3D space;
    identifying and removing a ground plane in the down-sampled 3D point cloud to leave non-ground data points in the down-sampled 3D point cloud;
    generating a set of 3D candidate blobs by clustering the non-ground data points to generate a plurality of 3D blobs, each of the 3D blobs having a cluster size;
    extracting features from each 3D candidate blob, the features being vectors that represent morphological characteristics of each 3D candidate blob; and
    classifying at least one of the 3D candidate blobs as a pre-defined object class based on the extracted features by assigning a semantic meaning to a segmented real-world individual object.

10. The method as set forth in claim 9, wherein generating the set of 3D candidate blobs further includes thresholding the 3D blobs based on cluster size.

11. The method as set forth in claim 9, wherein the 3D point cloud is down sampled using a 3D voxel grid having a plurality of voxels, where the 3D voxel grid is positioned over the 3D point cloud such that all the data points in each voxel are down-sampled to a centroid for each voxel.

12. The method as set forth in claim 9, wherein the ground plane is identified using a plane model such that the plane with a maximum number of points is identified as the ground plane.

13. The method as set forth in claim 9, wherein identifying and removing the ground plane further comprises acts of:
  randomly selecting three non-collinear unique points from the down-sampled 3D point cloud P;
  computing plane model coefficients from the three non-collinear unique points;
  computing distances from all points in the down-sampled 3D point cloud P to the plane model; and
  determining a number of points p* belonging to the down-sampled 3D point cloud P whose distance to the plane model falls between a pre-defined range; and
  designating a plane with a largest number of points p* that fall within the pre-defined range as the ground plane; and
  removing the points p* that are included in the ground plane from the down-sampled 3D point cloud P data to leave non-ground data points.

14. The method as set forth in claim 9, wherein clustering the non-ground data points to generate a plurality of 3D blobs further comprises acts of:
  creating a kd-tree representation for the down-sampled 3D point cloud P;
  generating an empty list of clusters C, and a queue of the points that need to be checked Q;
  for every point $p_i \in P$, performing the following operations:
    adding $p_i$ to the current queue Q;
    for every point $p_i \in Q$ do:
      recursively adding all neighboring points in a sphere with a fixed radius, and when the list of all points in Q has been processed, add Q to the list of clusters C, and reset Q to an empty list; and
    terminating when all points in the original point cloud have been processed and are now part of the list of clusters C.

15. The method as set forth in claim 9, wherein clustering the non-ground data point to generate a plurality of 3D blobs further comprises an act of, for every point in the down-sampled 3D point cloud P, recursively adding all neighboring points in a sphere with a fixed radius to a queue.

16. The method as set forth in claim 9, wherein extracting features from each 3D candidate blob further comprises acts of:
  projecting the 3D candidate blobs into multiple two-dimensional (2D) image slices at different heights; and
  processing each 2D image slice to extract features from each 2D image slice.

17. A computer program product for filtering, segmenting and recognizing objects, the computer program product comprising:
  a non-transitory computer-readable medium having executable instructions encoded thereon, such that upon execution of the instructions by one or more processors, the one or more processors perform operations of:
    down sampling a three-dimensional (3D) point cloud having a plurality of data points in 3D space to generate a down-sampled 3D point cloud P with reduced data points in the 3D space;
    identifying and removing a ground plane in the down-sampled 3D point cloud to leave non-ground data points in the down-sampled 3D point cloud;
    generating a set of 3D candidate blobs by clustering the non-ground data points to generate a plurality of 3D blobs, each of the 3D blobs having a cluster size;
    extracting features from each 3D candidate blob, the features being vectors that represent morphological characteristics of each 3D candidate blob; and
    classifying at least one of the 3D candidate blobs as a pre-defined object class based on the extracted features by assigning a semantic meaning to a segmented real-world individual object.

18. The computer program product as set forth in claim 17, wherein generating the set of 3D candidate blobs further includes thresholding the 3D blobs based on cluster size.

19. The computer program product as set forth in claim 17, wherein the 3D point cloud is down sampled using a 3D voxel grid having a plurality of voxels, where the 3D voxel grid is positioned over the 3D point cloud such that all the data points in each voxel are down-sampled to a centroid for each voxel.

20. The computer program product as set forth in claim 17, wherein the ground plane is identified using a plane model such that the plane with a maximum number of points is identified as the ground plane.

21. The computer program product as set forth in claim 17, wherein identifying and removing the ground plane further comprises operations of:
  randomly selecting three non-collinear unique points from the down-sampled 3D point cloud P;
  computing plane model coefficients from the three non-collinear unique points;
  computing distances from all points in the down-sampled 3D point cloud P to the plane model; and
  determining a number of points p* belonging to the down-sampled 3D point cloud P whose distance to the plane model falls between a pre-defined range; and designating a plane with a largest number of points p* that fall within the pre-defined range as the ground plane; and removing the points p* that are included in the ground plane from the down-sampled 3D point cloud P data to leave non-ground data points.

22. The computer program product as set forth in claim 17, wherein clustering the non-ground data points to generate a plurality of 3D blobs further comprises operations of:

creating a kd-tree representation for the down-sampled 3D point cloud P;

generating an empty list of clusters C, and a queue of the points that need to be checked Q;

for every point $p_i \in P$, performing the following operations:

adding $p_i$ to the current queue Q;

for every point $p_i \in Q$ do:

recursively adding all neighboring points in a sphere with a fixed radius, and when the list of all points in Q has been processed, add Q to the list of clusters C, and reset Q to an empty list; and terminating when all points in the original point cloud have been processed and are now part of the list of clusters C.

23. The computer program product as set forth in claim 17, wherein clustering the non-ground data point to generate a plurality of 3D blobs further comprises an operation of, for every point in the down-sampled 3D point cloud P, recursively adding all neighboring points in a sphere with a fixed radius to a queue.

24. The computer program product as set forth in claim 17, wherein extracting features from each 3D candidate blob further comprises operations of:

projecting the 3D candidate blobs into multiple two-dimensional (2D) image slices at different heights; and processing each 2D image slice to extract features from each 2D image slice.

\* \* \* \* \*